June 19, 1923.
A. J. KELLY
1,459,371
CONVERTIBLE VEHICLE
Filed April 18, 1922
3 Sheets-Sheet 3
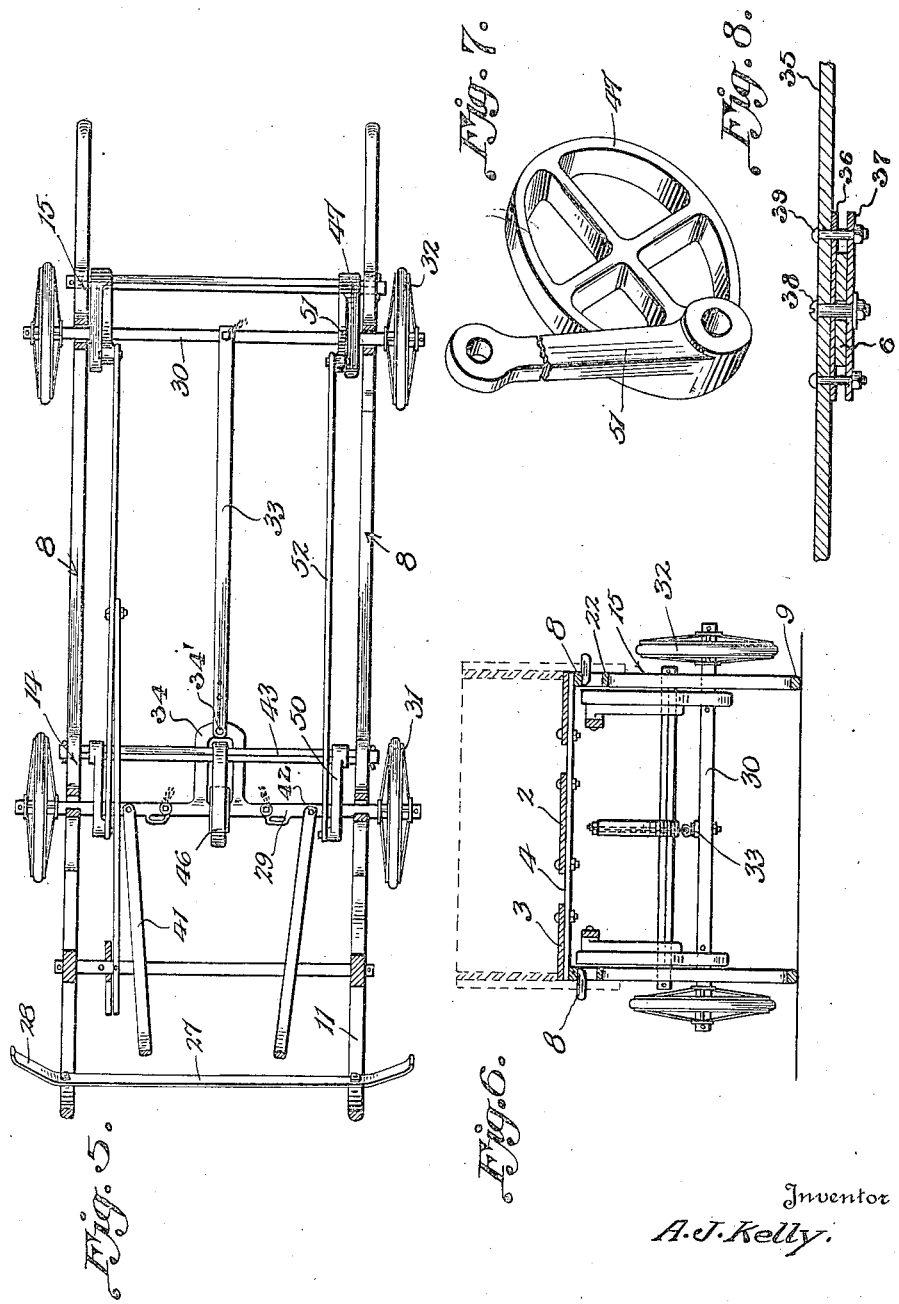
Inventor
A. J. Kelly.
By
Larry & Lacey, Attorneys Patented June 19, 1923.

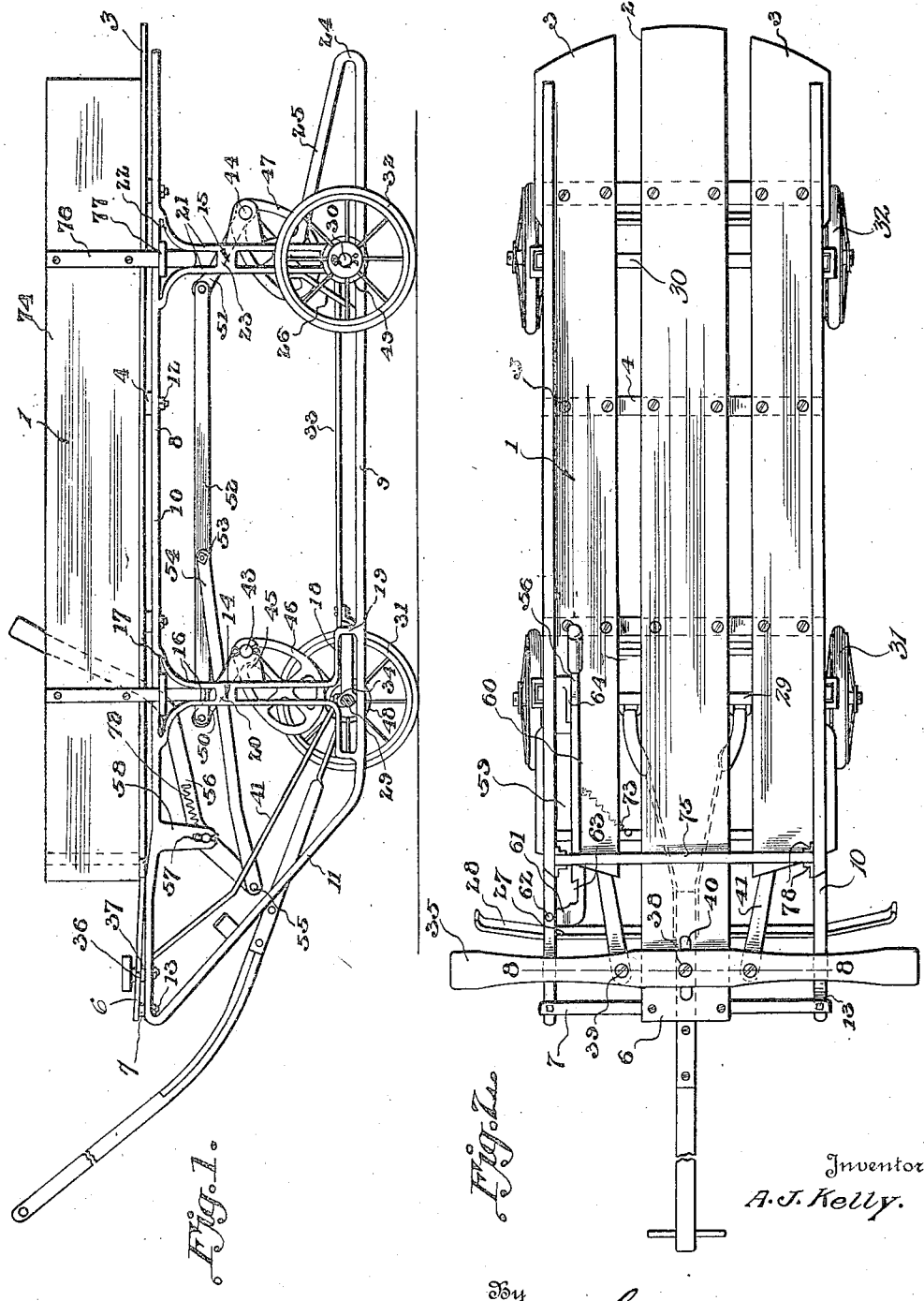

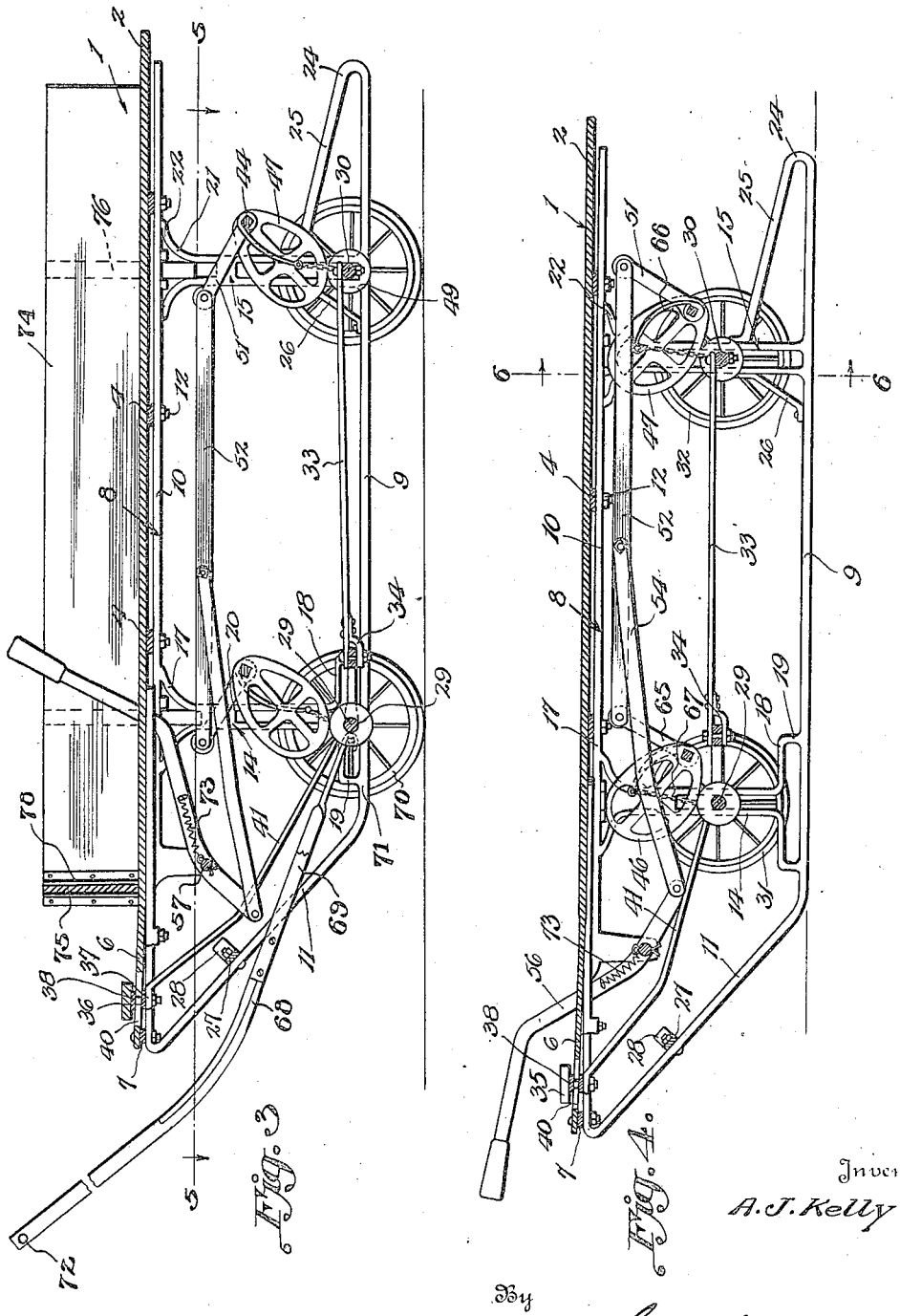

1,459,371

UNITED STATES PATENT OFFICE.

ANDREW J. KELLY, OF BALTIMORE, MARYLAND, ASSIGNOR OF ONE-HALF TO JOHN IRA KELLY, OF BALTIMORE, MARYLAND.

CONVERTIBLE VEHICLE.

Application filed April 18, 1922. Serial No. 554,900.

*To all whom it may concern:*

Be it known that I, ANDREW J. KELLY, a citizen of the United States, residing at Baltimore city, in the State of Maryland, have invented certain new and useful Improvements in Convertible Vehicles, of which the following is a specification.

This invention relates to improvements in children's vehicles and more particularly to that type which are adapted to be supported for travel selectively upon runners or upon wheels so that the vehicle may be made use of under all weather conditions and may be appropriately adjusted or converted in accordance therewith, and one of the primary objects of the present invention is to provide a novel means adapted to be readily and conveniently operated for the purpose of bringing the runners or wheels of the vehicle selectively into use.

Another object of the invention is to so construct a vehicle of the type above referred to that the presence of the means provided for converting the vehicle will not in any way interfere with the steering of the vehicle when supported upon its wheels.

A further object of the invention is to provide means whereby, when the vehicle is supported upon its runners, its wheels will be supported clear of the ground, and on the other hand when it is supported by its wheels, its runners will be supported clear of the ground so that when either is in use there will be no interference on the part of the other.

Another object of the invention is to provide novel means for positively elevating the wheels when the parts of the vehicle are adjusted so as to bring into use the runners.

Another object of the invention is to provide in connection with the vehicle, a tongue whereby the same may be drawn when the vehicle is supported by the wheels, means being provided whereby the tongue may be readily connected with and disconnected from the front axle of the vehicle so that when it is not required to be used it may be readily disconnected and it will therefore not interfere with the use of the vehicle as a sled.

A further object of the invention is to provide novel means whereby sideboards and an end gate may be associated with the body of the vehicle to suitably enclose the body when desired.

This application constitutes a continuation, in part, of my application filed April 30, 1921, Serial No. 465,882.

In the accompanying drawings:

Figure 1 is a side elevation of the vehicle embodying the invention adjusted to be supported upon its wheels;

Figure 2 is a top plan view of the vehicle;

Figure 3 is a vertical longitudinal sectional view through the vehicle adjusted as shown in Figure 1;

Figure 4 is a similar view illustrating the vehicle adjusted to be supported upon its runners;

Figure 5 is a horizontal sectional view taken substantially on the line 5—5 of Figure 3 looking in a downward direction;

Figure 6 is a vertical transverse sectional view substantially on the line 6—6 of Figure 4 looking in the direction indicated by the arrows;

Figure 7 is a perspective view of one of the cam members provided for elevating the vehicle body with relation to the axles and thus render the runners inactive and the wheels active; and Figure 8 is a vertical transverse sectional view taken substantially on the line 8—8 of Figure 2.

The vehicle comprises a body which is indicated in general by the numeral 1 and which may consist of a number of floor boards as for example an intermediate longitudinal board 2, and lateral boards 3 disposed at opposite sides of and parallel to the board 2, or the bed of the body may be otherwise constructed if desired. Where the body bed comprises a number of boards such as the boards 2 and 3, the same are preferably connected together and relatively braced by cross bars 4 preferably of bar metal bolted or otherwise secured as at 5 to the under sides of the boards 2 and 3 and extending transversely with relation thereto. Preferably the intermediate board 2 extends at its forward portion beyond the forward ends of the boards 3 as indicated by the numeral 6, and a cross bar 7 is bolted or otherwise secured to the under side of the extension 6 and projects beyond the lateral edges thereof.

The means provided for supporting the vehicle body for travel over snowy or icy surfaces embodies runner frames which are indicated in general by the numeral 8. Each of these frames includes a lower portion constituting a runner indicated by the numeral 9, an upper portion 10 which extends parallel to and in a plane above the portion 9, and a connecting front portion 11 which is curved at its juncture with the runner 9 and extends upwardly and forwardly therefrom and forms a union with the forward end of the upper member 10. The runner frames are disposed beneath the body of the vehicle at the opposite sides thereof and are bolted or otherwise secured as at 12 to the under sides of the cross bars 4 at the ends of the latter and as at 13 to the under side of the cross bar 7 at the ends thereof, the bolts 12 preferably passing also through the lateral boards 3. Each runner frame further embodies in its structure a front bolster 14 and a rear bolster 15. The bolster 14 preferably comprises spaced members 16 which extend parallel throughout the greater portions of their height but preferably have their upper portions diverging as at 17 and united preferably integrally with the under side of the upper member 10 of the runner frame. Near their lower ends, the side members 16 are extended forwardly and rearwardly in opposite directions as at 18 and thence downwardly as at 19 and united at their lateral portions preferably integrally to the upper side of the runner 9. The said members 16 of the bolster may be united between their upper and lower ends, at a suitable point, by an integral web indicated by the numeral 20, and the portions of the said members 16 below the web, in conjunction with the front and rear extensions 18 and downwardly extending portions 19, constitute guiding means for the front axle of the vehicle as will presently be made clear. In a similar manner the rear bolster 15 of each runner frame comprises spaced members 21 which have their upper portions diverged as at 22 and united to the under side of the top member 10 of the said runner frame, and these portions 21 are united at their lower ends to the upper side of the runner 9 and, except for their upper portions 22, are preferably parallel and spaced throughout their lengths except that they may be connected at some intermediate point by an integral web 23 corresponding to the web 20. The portions of the spaced members 21 below the web 23 constitute guiding means for the rear axle of the vehicle as will presently be explained. At a point rearwardly of the bolster 15, the runner 9 of each runner frame is bent upwardly as at 24 and thence to extend upwardly and forwardly as at 25, and the end of the portion 25 is united to the rear one of the members 21 of the said bolster. If desired the bolster may be further braced with relation to the runner 9 by means of a diagonal brace 26 extending diagonally between the said runner and the forward one of the members 21. In order to provide a foot rest and likewise to relatively brace the runner frames, a cross bar 27 is secured to the portions 11 of the runner frames and extends transversely between said frames, the ends of this cross bar projecting beyond the runner frames to provide foot rests 28.

The front and rear axles above referred to are indicated respectively by the numerals 29 and 30 and are supported at their ends by wheels 31 and 32 respectively. The front axle 29, at points immediately inwardly of the wheels 31 thereon, extends within the lower guide portions of the bolsters 14 and is adapted to be guided for vertical movement between the spaced members 16 of the said bolster and for oscillatory adjustment in a horizontal plane between the guide portions 18 of said bolsters and the runners 9. The axle 30 is likewise, in effect, a floating axle in that it is capable of vertical adjustment between and guided by the spaced members 21 of the bolsters 15. A reach bar 33 is secured at its rear end to the rear axle 30 at a point substantially midway between the ends thereof, and is pivotally connected by a bolt 34' to the intermediate portion of a yoke 34 preferably formed integrally with the rear side of the front axle 29. Front and rear displacement of the rear axle 30 is of course prevented by the spaced portions 21 of the rear bolsters 15, and inasmuch as the reach bar 33 is rigid and of a definite length, similar displacement of the front axle 29 is prevented. However when the front axle is lowered to the position shown in Figure 1 of the drawings its end portions will be in a plane immediately below the guide portions 18 of the front bolsters 14, and the axle may therefore have angular movement about the pivot 34 to permit of steering of the vehicle.

In order that the axle 29 may be angularly adjusted about the pivot 34 to provide for steering of the vehicle, a steering bar 35 is mounted upon the upper side of the extension 6 of the intermediate board 2 and is provided upon its under side with a longitudinal plate or bar 36 which rests upon the upper side of said extension. A similar bar 37 extends transversely beneath the extension 6 and in spaced parallel relation to the bar 36, and bolts 38 and 39 are secured through the steering bar 35 and through the bars 36 and 37. The bolt 38 extends also through a slot 40 formed longitudinally in the extension 6 of the intermediate board 2, and the steering bar 35 projects beyond the runner frames 8 where it may be grasped by the hands or engaged by the feet and oscillated about the said bolt 38. The engagement of the bars 36 and 37 above and below the extension 6 serves of course to restrain the steering bar 35 against upper displacement without however interfering in any way with the oscillatory movement of the bar about the pivot bolt 38. Radius rods 41 are pivotally connected at their forward ends to the steering bar 35 through the medium of the bolts 39 and at their rear ends are pivotally connected as at 42 to the axle 29 at opposite sides of the pivot bolt 34. It will now be evident that by oscillating the steering bar 35, the axle 29 may be correspondingly oscillated so as to change the direction of travel of the vehicle. It will also be evident that the radius rod connection between the axle and steering bar 35 does not interfere in any way with the proper functioning of these parts or with adjustment of the axle in a vertical direction, inasmuch as the pivot bolt 38 for the steering bar is freely slidable in the slot 40 in the extension 6 and, when the axle 29 is moved upwardly within the guide portions of the front bolster 14, the bolt 38 will be shifted forwardly in the slot 40 and on the other hand when the axle is moved downwardly in the bolsters the bolt 38 will be shifted rearwardly in said slot.

The means provided for vertically adjusting the axles 29 and 30 embodies shafts 43 and 44 mounted in suitable bearings 45 upon the rear sides of the bolsters 14 and 15 respectively. Fixed upon these shafts are cams 46 and 47 which ride at their peripheries against small anti-friction wheels 48 and 49 rotatably mounted upon the axles 29 and 30 respectively. There are preferably two of the cams 47 and anti-friction wheels 49, and these parts are located at the opposite sides of the structure, but there is only one cam 46 and one anti-friction wheel 48, these parts being located midway between the ends of the front axle 29 so that they will remain at all times in peripheral contact regardless of the oscillatory adjustment of said axle in steering the vehicle. Crank arms 50 and 51 are secured upon the shaft 43 and integrally connected with the cams 47 and extend generally in an upward direction and are connected at their upper ends by connecting bars 52. Pivotally connected at its rear end to one of the bars 52 as at 53, is a connecting bar 54 the front end of which is pivotally connected as at 55 to the lower end of a hand lever 56 pivotally mounted for rocking movement upon a shaft 57 in turn mounted in suitable bearing brackets 58 projecting downwardly from the forward portions of the upper members 10 of the runner frames. The upper portion of the lever 56 projects upwardly through a slot 59 provided in one of the boards 3, and a rack bar 60 is arranged beneath this board and has a laterally turned forward end 61 which is bolted or otherwise secured as at 62 to the said member 10, the rack bar at its rear end being secured by one of the bolts 12 which secures in place the cross bars 4. The rack bar extends parallel to the slot 59 and is provided with notches 63 and 64 in which the said upper portion of the lever 56 is selectively engageable. When the lever 56 is swung rearwardly to the position shown in Figures 1, 2 and 3 of the drawings, a forward pull will be exerted upon the connecting bar 54 and the bars 52 thus rocking the shafts 43 and 44 in a forward direction to swing the cams 46 and 47 downwardly against the anti-friction wheels 48 and 49. Thus the axles 29 and 30 will be depressed to bring the wheels 31 and 32 into contact with the ground surface and subsequently elevating the vehicle body and the runner frames so that the runners 9 will be clear of the ground. The lever 56 is held in this position of adjustment by engagement in the notch 64. When it is desired to bring the runners 9 into use and render the wheels 31 and 32 inactive, the lever 56 is sprung laterally, sufficient play being allowed for this purpose, to disengage it from the notch 64 in the rack bar 60, and the said lever is then swung in a forward direction thus exerting a rearward thrust upon the connecting bar 54 and the bars 52 and rotating the shafts 43 and 44 rearwardly to elevate the cams 46 and 47 and permit the axles 29 and 30 to move upwardly into the vertical slots of the bolsters 14 and 15. The weight of the vehicle body will of course influence this upward movement of the axles until the runners come into contact with the ground surface, and further upward movement of the axles is provided for by securing arms 65 and 66 upon the shafts 43 and 44 and suspending chains 67 from these arms and connecting said chains with the axles 29 and 30. In this movement of the lever 56 it will finally assume substantially the position shown in Figure 4 of the drawings in which position it may be engaged in the notch 63 in the rack bar and held in such position.

In order that the vehicle may be drawn about over the ground surface when it is supported by its wheels 31 and 32, a tongue 68 is provided and this tongue supports at its lower end a yoke 69 the arms of which are provided with hooked terminals 70 which are engageable with bails 71 preferably integrally formed upon the forward side of the front axle 29. By engaging the terminals 70 with the bails 71, the tongue 68 may be readily connected with the front axle of the vehicle at points at opposite sides of the pivot bolt or king pin 34 and, by a handle 72 provided at the forward end of the tongue, may be employed in drawing the vehicle about from place to place. When it is not desired to use the tongue 68, the same may be readily disengaged from the axle and laid aside until again required to be used.

In order that the hand lever 56 may be yieldably held against the notched side of the rack bar 60 so as to be caused to engage in the notches in said bar and be retained in said notches when at the limits of its movement, a spring 73 is connected at one end to the inwardly presented side of said lever above the fulcrum for the lever and at its other end to the intermediate portion of the shaft 57.

In connection with the vehicle there may be employed side boards 74 and a front end gate 75, and the side boards are provided with stanchions 76 which project below the lower edges of the side boards and are adapted to be fitted into sockets 77 formed or provided upon the upper members 10 of the runner frames 8. Spaced guides 78 are provided upon the inner faces of the side boards 74 at their front ends to slidably receive the ends of the end gate 75.

Having thus described the invention, what is claimed as new is:

1. In a vehicle of the class described, a body, side frames supporting the body and including runners, the frames having rear vertical slots and front vertical slots, the latter having front and rear branches, front and rear axles mounted in the respective frame slots, wheels supporting the axles, shafts mounted in the frames above the axles, cams upon the shafts, anti-friction wheels upon the axles engaged by the peripheries of the cams, and means operable to rock the shafts whereby to angularly move the cams to adjust the axles vertically in the respective slots, the front axle being capable of angular adjustment, the cam and anti-friction wheel associated with the front axle being positioned substantially midway between the ends thereof and at the axis of angular movement of said axle whereby to maintain mutual contact in all positions of adjustment of said axle.

2. In a vehicle of the class described, a body, side frames supporting the body and including runners, a vertically adjustable rear axle carrying ground wheels, a front axle vertically adjustably mounted in the frames and carrying ground wheels, the front axle being capable of angular adjustment about an axis substantially midway between its ends, and means for adjusting the front axle comprising a cam coacting with the axle substantially at the axis about which it is angularly adjustable, and means for effecting movement of the cam.

3. In a vehicle of the class described, a body, side frames supporting the body and including runners, front and rear axles mounted for up and down adjustment in the frames, wheels supporting the axles, shafts mounted in the frames above the axles, cams carried by the shafts and coacting with the axles to depress the latter when the shafts are rotated in one direction, means operable to rotatably adjust the shafts, and operative connection between the shafts and the respective axles for elevating the axles when the shafts are rotatably adjusted in the opposite direction.

4. In a vehicle of the class described, a body, side frames supporting the body and including runners, front and rear axles mounted for up and down adjustment in the frames, wheels supporting the axles, shafts mounted in the frames above the axles, cams carried by the shafts and coacting with the axles to depress the latter when the shafts are rotated in one direction, means operable to rotatably adjust the shafts, and operative connection between the shafts and the respective axles for elevating the axles when the shafts are rotatably adjusted in the opposite direction, the said connection comprising arms extending from the shafts, and flexible elements connected with the arms and with the axles.

5. In a vehicle of the class described, a body including a bottom, side frames supporting the body and having vertical slots provided with front and rear branches, an axle mounted for vertical adjustment in said slots and capable of angular adjustment in the branches thereof, means operable to adjust the said axle in an up and down direction, a steering member mounted for turning movement and for back and forth sliding movement upon the bottom of the body and in its latter movement compensating for the vertical adjustment of the said axle, and operative connection between said steering member and the axle to angularly adjust the latter when the former is adjusted.

6. In a vehicle of the class described, a body including a bottom, side frames supporting the body and having vertical slots provided with front and rear branches, an axle mounted for vertical adjustment in said slots and capable of angular adjustment in the branches thereof, means operable to adjust the said axle in an up and down direction, a steering member mounted for turning movement and for back and forth sliding movement upon the bottom of the body and in its latter movement compensating for the vertical adjustment of the said axle, and operative connection between said steering member and the axle to angularly adjust the latter when the former is adjusted, the said means comprising reach bars connected to the steering member at opposite sides of its axis of movement and to the axle at opposite sides of the axis of movement thereof.

7. In a vehicle of the class described, a body including a bottom board having a longitudinal slot therein, side frames supporting the body and having vertical slots provided with front and rear branches, an axle mounted for vertical adjustment in the frame slots and capable of angular adjustment about an axis intermediate its ends when in position to work in the branches of the said frame slots, a steering bar disposed above the bottom board of the body, a bar disposed beneath the said bottom board, a pivot bolt extending through the bars and through the slot in the said board whereby to provide for angular adjustment of the steering bar and for front to rear adjustment thereof, other bolts securing the last mentioned bar to the steering bar in spaced relation thereto, and radius bars pivotally connected to the last mentioned bolts and at their rear ends to the said axle at opposite sides of the axis of adjustment thereof.

8. In a vehicle of the class described, a body, side frames supporting the body and including runners, axles mounted for up and down adjustment in the side frames, wheels carried by the axles, shafts mounted in the frames, cams upon the shafts coacting with the axles to depress the same when the shafts are rocked in one direction, arms extending from the shafts, a rod extending between and connecting said arms, a shaft mounted in the frames in advance of the front axle, a lever mounted for rocking movement upon the last mentioned shaft and extending up through the bottom of the body, operative connection between the lever below its pivot and the connecting means between said arms, a notched rack bar beside which the upper portion of the lever is movable, and a spring connected to the said last mentioned shaft and to the lever and yieldably holding the same in a lateral direction for engagement in the notches in the rack bar.

In testimony whereof I affix my signature.

ANDREW J. KELLY. [L. S.]